(12) United States Patent
Hsieh

(10) Patent No.: US 7,101,130 B2
(45) Date of Patent: Sep. 5, 2006

(54) FASTENER FOR SECURING A CARGO CONTAINER

(76) Inventor: David Hsieh, 3f, No. 2, Chin-Chung St., Taichung City (TW)

( * ) Notice: Subject to any disclaimer, the term of this patent is extended or adjusted under 35 U.S.C. 154(b) by 0 days.

(21) Appl. No.: 11/062,070

(22) Filed: Feb. 18, 2005

(65) Prior Publication Data

US 2006/0099043 A1    May 11, 2006

(30) Foreign Application Priority Data

Nov. 9, 2004    (TW) .............................. 93134112 A

(51) Int. Cl.
*B60P 7/08*    (2006.01)

(52) U.S. Cl. ..................... 410/85; 410/96; 410/77; 410/100

(58) Field of Classification Search .............. 410/77, 410/80, 81, 85, 96, 97, 100; 114/75; 248/499
See application file for complete search history.

(56) References Cited

U.S. PATENT DOCUMENTS

| | | | | |
|---|---|---|---|---|
| 6,666,633 B1 * | 12/2003 | Hsieh | .......................... | 410/85 |
| 6,666,634 B1 | 12/2003 | Hsieh | .......................... | 410/85 |
| 6,669,417 B1 * | 12/2003 | Hsieh | .......................... | 410/85 |
| 6,908,268 B1 * | 6/2005 | Hsieh | .......................... | 410/85 |

* cited by examiner

*Primary Examiner*—Stephen Gordon
(74) *Attorney, Agent, or Firm*—Baker & Daniels

(57) ABSTRACT

A fastener for securing a cargo container includes a first fastener component and a second fastener component. The first fastener includes a pair of rails which bridge a first and a second fixed body. A lock body is slidably mounted on the rails, and has two opposite ends abutting respectively against the rails and a locking hole between the opposite ends. The second fastener component includes a threaded stem which extends between the pair of rails through a screw hole formed in the first fixed body, and a locking portion extending into the locking hole. An engagement unit provides engagement of the locking portion in the locking hole such that relative rotation of the stem and the lock body is permitted only in one single direction that causes the stem to move toward the second fixed body.

5 Claims, 7 Drawing Sheets

FASTENER FOR SECURING A CARGO CONTAINER

CROSS-REFERENCE TO RELATED APPLICATION

This application claims priority from Taiwanese Invention Patent Application No. 093134112 filed Nov. 9, 2004, now U.S. Pat. No. 6,908,268.

BACKGROUND OF THE INVENTION

1. Field of the Invention

The present invention relates to a fastener, more particularly to a fastener for securing a container on the deck of a cargo vessel or ship in which the fastening tension can be easily and simply adjusted and ineffective fastening can be avoided.

2. Description of the Related Art

Generally, when containers are being transported in a cargo vessel or ship, in order to prevent undesired movement or toppling down of the containers 11 stacked on the ship as shown in FIG. 1, lashing ropes 2 and fastening assemblies 3 are used to secure the containers 11 to deck fittings (not shown) on a deck 12 of the ship. The conventional fastening assembly 3 includes a connecting member 31 and a connecting rod 32 that are connected in threaded engagement. However, when the ship pitches and rolls in a stormy sea, the threaded connection may be loosened thus resulting in disengagement of the connecting member 31 from the connecting rod 32 and, hence, ineffective fastening.

U.S. Pat. No. 6,666,634 proposes a "Positioning assembly for positioning a container on a platform," which was intended to overcome the aforesaid drawback of the conventional fastening assembly. The positioning assembly includes a limiting seat formed with a limiting hole, and a platform-connecting rod that engages threadedly a container-connecting unit and that has an engaging stud portion for engaging the limiting hole to arrest rotation of the platform-connecting rod, thereby preventing undesired disengagement of the platform rod from the container-connecting unit. However, the limiting seat may still disengage from the platform-connecting rod due to severe rocking of the ship.

In U.S. patent application Ser. No. 10/868,288 entitled, "Fastener for Securing a Container on a Vehicle and now issued as U.S. Pat. No. 6,908,268," a first fastener component of a fastener assembly disclosed therein includes a lock body mounted slidably on two rails which bridge a pair of fixed bodies. A threaded stem of a second fastener component extends between the two rails as it is passed threadedly through a screw hole formed in one of the fixed bodies. In use, the stem is not rotatable when connected to a deck fitting. The first fastener component is connected to a rope and is turnable relative to the stem to tension or loosen the rope. The lock body, when engaging a locking portion on the stem, restraints relative rotation between the stem and the first fastener component so that the rope is prevented from becoming loosened undesirably.

There is still, however, room for improvement of such a fastener in terms of providing a more reliable engagement between the lock body and the stem of the second fastener component and of preventing undesirable loosening of the rope caused by the relative rotation between the stem and the first fastener component. The present invention is directed to such improvement, or at least aims to provide the public with a useful alternative.

SUMMARY OF THE INVENTION

Therefore, a main object of the present invention is to provide an improvement over a fastener of the type disclosed in the above-mentioned U.S. application, in which relative rotation of the stem and the first fastener component in one single direction is permitted to tension the rope even when the locking portion of the stem engages the lock body, and undesired slackening of the fastening tension during use is prevented.

Accordingly, the present invention provides a fastener for fastening a cargo container which comprises a first fastener component including a first and a second fixed body, and a pair of rails bridging the first and the second fixed body, the first fixed body having a screw hole; a lock body mounted on the rails for sliding along the rails, and having two opposite ends abutting respectively against the rails and a locking hole formed between the opposite ends; a second fastener component including a stem extending threadedly through the screw hole toward the second fixed body, and a locking portion for extending into the locking hole; and an engagement unit providing engagement of the locking portion in the locking hole such that relative rotation of the stem and the locking body is permitted only in one single direction that causes the stem to move toward the second fixed body.

BRIEF DESCRIPTION OF THE DRAWINGS

Other features and advantages of the present invention will become apparent in the following detailed description of the preferred embodiment with reference to the accompanying drawings, in which.

DETAILED DESCRIPTION OF THE PREFERRED EMBODIMENT

The construction of a preferred embodiment of the fastener according to the present invention will now be described in greater detail below.

Figure 1:
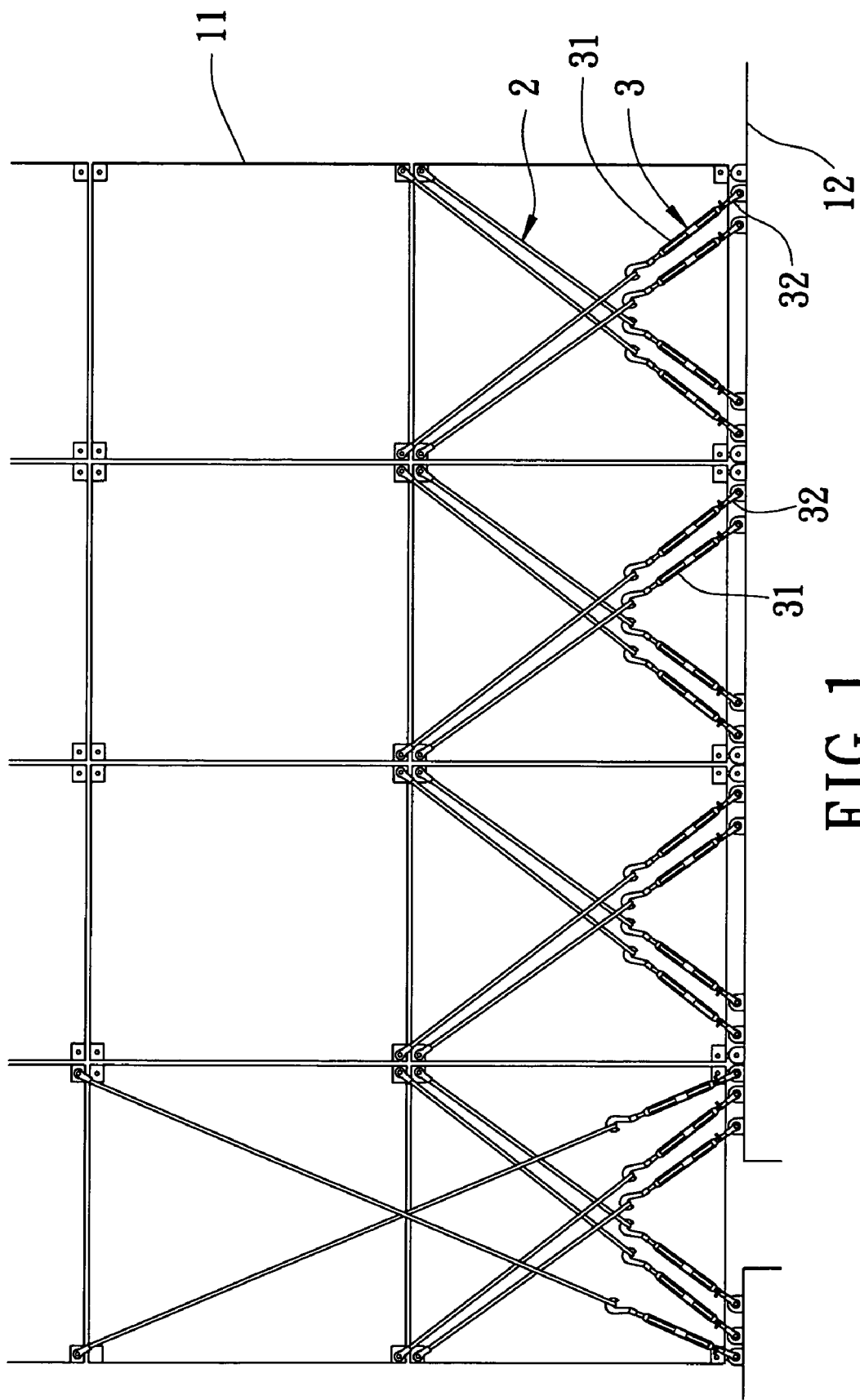
FIG. 1 is a schematic view showing the conventional fastener assemblies securing a stack of containers on the deck of a ship.
Figure 2:
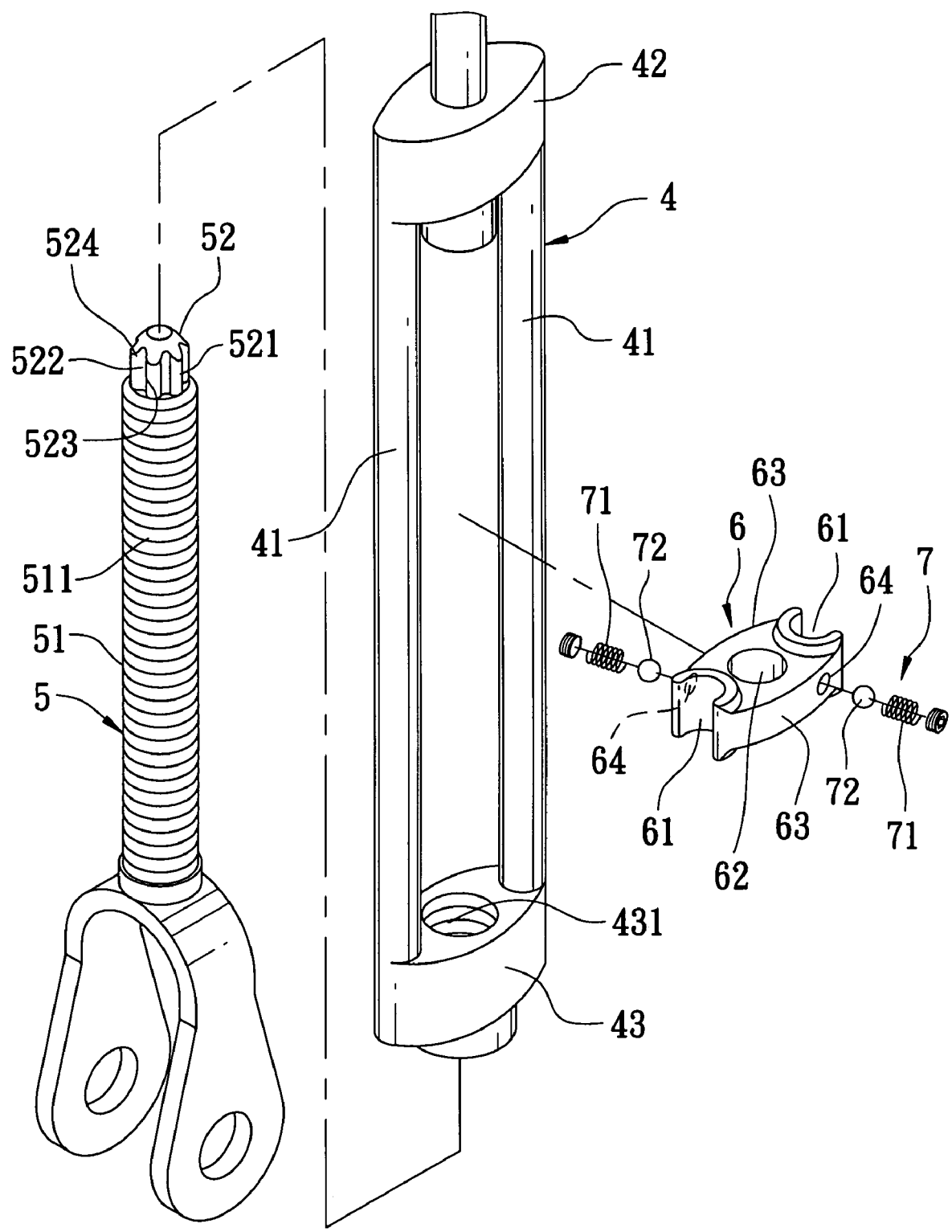
FIG. 2 is an exploded, perspective view of a preferred embodiment of the fastener according to the present invention.
Figure 3:
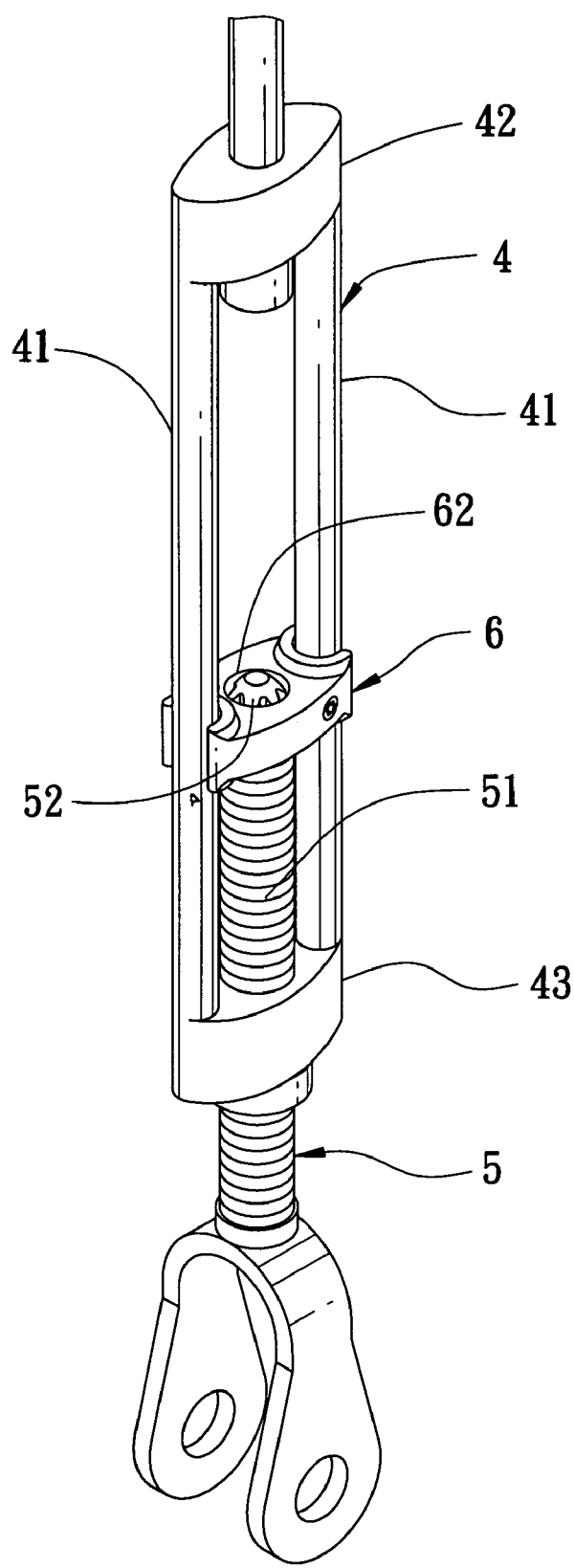
FIG. 3 is a perspective view of the preferred embodiment in an assembled state.

With reference to FIGS. 2 and 3, a fastener for a cargo container according to a preferred embodiment of the present invention generally comprises a first fastener component 4, a second fastener component 5, a lock body 6 and an engagement unit 7.

The first fastener component 4 includes a pair of rails 41 in parallel arrangement in the axial direction and configured as rods in this embodiment, a first fixed body 43 connected to lower ends of the rails 41, and a second fixed body 42 connected to upper ends of the rails 41. A screw hole 431 is provided between the two opposing ends of the first fixed body 43.

The second fastener component 5 includes a stem 51 which is formed with a male thread portion 511, and a locking portion 52 formed on an upper end of the stem 51. In this embodiment, the locking portion 52 is toothed and has a plurality of radially projecting teeth 521 and a plurality of substantially V-shape recesses 522 each defined by respective walls 523,524 of two adjacent ones, denoted 521a,521b, of the teeth 521. The diameter of stem 51 is substantially larger than that of the locking portion 52.

The lock body 6 is mounted on the rails 41 for sliding movement along the rails 41 so as to move away or toward the second fixed body 42 and has two opposite ends 61 abutting against the rails 41, respectively, and two opposing side walls 63 interconnecting the opposite ends 61. A circular locking hole 62, with a diameter greater than that of the locking portion 52, is formed between the opposite ends 61 and between the side walls 63. Preferably, the opposite ends 61 are notched to receive the rails 41, respectively.

The engagement unit 7 includes at least one bore 64 formed in the lock body 6, an engaging element 72 received in the bore 64, and a spring 71 biasing the engaging element 72. In this embodiment, a pair of bores 64 are provided in the lock body 6, one being formed between the locking hole 62 and one of the opposite ends 61 and the other between the locking hole 62 and the other one of the opposite ends 61, and each having an engaging element 72 biased by a spring 71. As shown in FIG. 2, the pair of bores 64 are substantially opposite to each other in a diametrical direction of the circular locking hole 62, and the engaging elements 72 are each in the form of a rounded bead.

Figure 7:
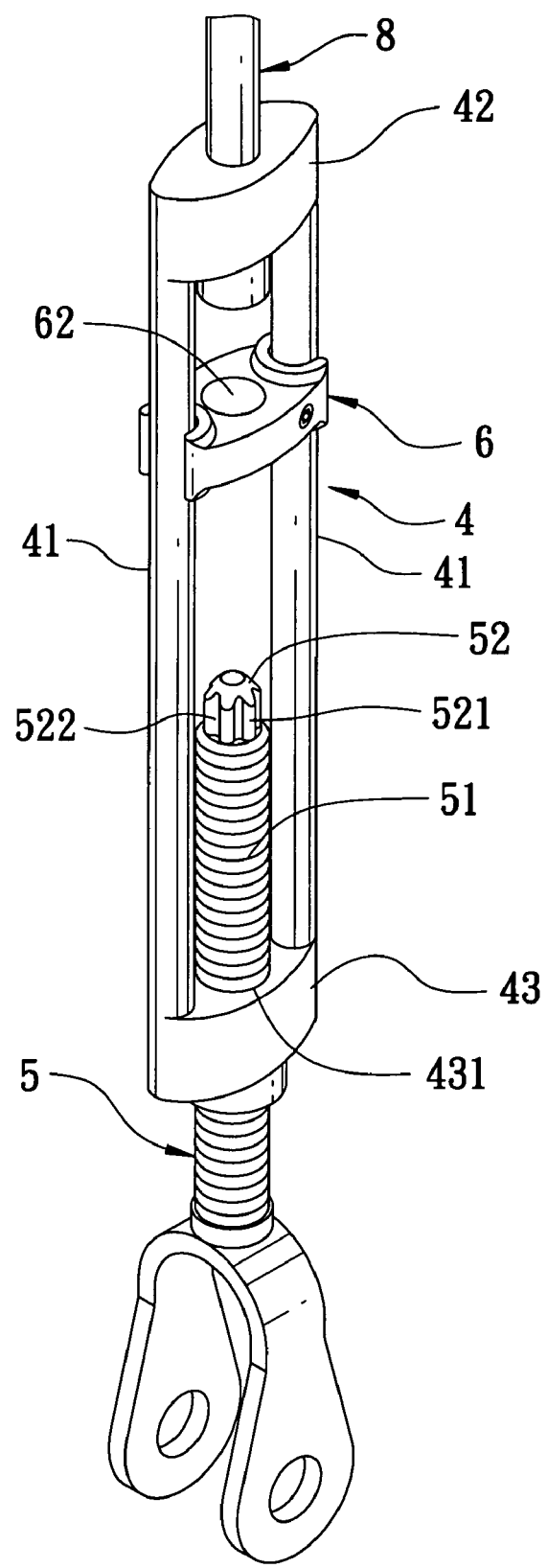
FIG. 7 is a perspective view of the preferred embodiment showing the disengagement of the lock body from the locking portion.

The fastener of the present invention is assembled as shown in FIG. 3. The lock body 6 is mounted at a selected position on the rails 41 of the first fastener component 4 and the stem 51 of the second fastener component 5 is threaded into the screw hole 431 of the first fastener component 4, until the locking portion 52 is positioned in the locking hole 62 of the lock body 6 and engaged in the locking hole 62 through the engagement unit 7. This assembled state in which the locking portion 52 is engaged in the locking hole 62 is the condition of the fastener when used to secure a container on the deck of a ship. As in the conventional art, the fastener of the present invention is used in conjunction with a lashing rope 8 (see FIG. 7) to secure a cargo container to a deck fitting (not shown in the drawings). Fastening is accomplished by adjusting the threaded depth of the stem 51 of the second fastener component 5 in the screw hole 431 of the first fastener component 4 to provide a desired tension of the rope 8.

Figure 4:
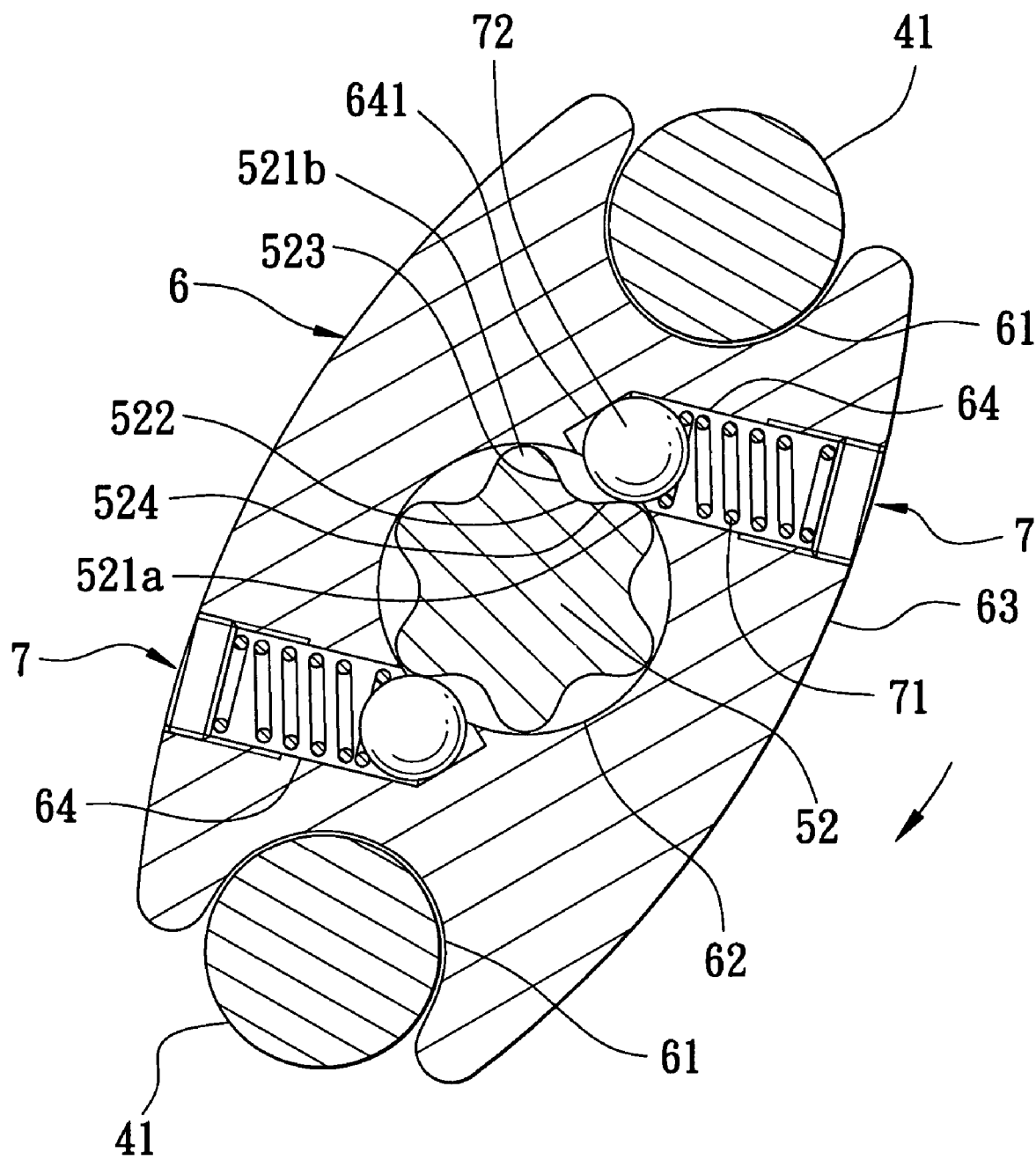
FIG. 4 is a sectional view of the preferred embodiment, showing the lock body not turnable clockwise relative to the locking portion.

As shown in FIGS. 2 and 4, each of the bores 64 formed in the lock body 6 are in communication with, and extend substantially in a tangential direction of, the locking hole 62 and has an end wall 641. The end wall 641 inclines with respect to the tangential direction. Each engaging element 72, subjected to the biasing force of the spring 71, is urged to protrude into the locking hole 62 and to abut against the end wall 641.

Figure 5:
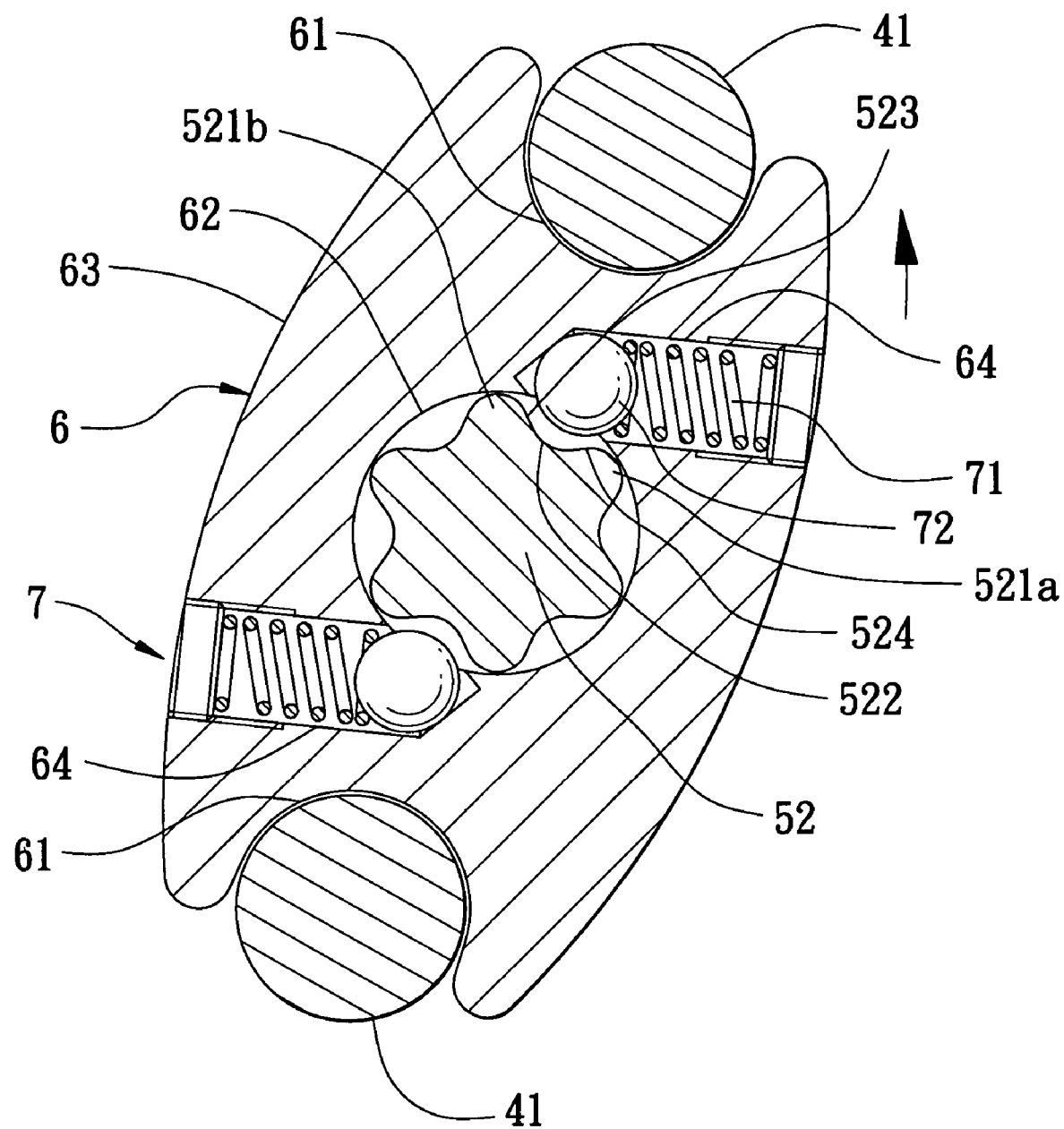
FIG. 5 is a sectional view of the preferred embodiment, showing the lock body being turnable counterclockwise relative to the locking portion.

Accordingly, by this arrangement, the relative rotation of the stem 51 and the lock body 6 is permitted only in one single direction—the counterclockwise direction of rotation of the lock body 6 relative to the stem 51 shown in FIG. 5—that causes the stem 51 to move toward the second fixed body 42 thus increasing the threaded depth of the stem 51 in the first fastener component 4, and is prevented from turning in the opposite direction—the clockwise direction of rotation of the lock body 6 relative to the stem 51 shown in FIG. 4. Specifically, as stated in the foregoing, the engaging element 72 normally protrudes partially in the recess 522 formed by the two adjacent ones, specifically denoted by 521a,521b, of the teeth 521 of the locking portion 52. With reference to FIG. 4, if the lock body 6 is urged to turn in the clockwise direction, the wall 524 of the tooth 521 *a* will push the engaging element 72 toward the end wall 641 of the bore 64, so that the engaging element 72 is prevented from retracting into the bore 64 from the locking hole 62. The engaging element 72 will be confined between the end wall 641 and the adjacent tooth 521a and thus rendered immovable because the counter-acting force when the tooth 521a and the engaging element 72 contact each other is toward the end wall 641. This prevents slippage of the lock body 6 from the locking portion 52 or vice versa which leads to ineffective fastening.

Figure 6:
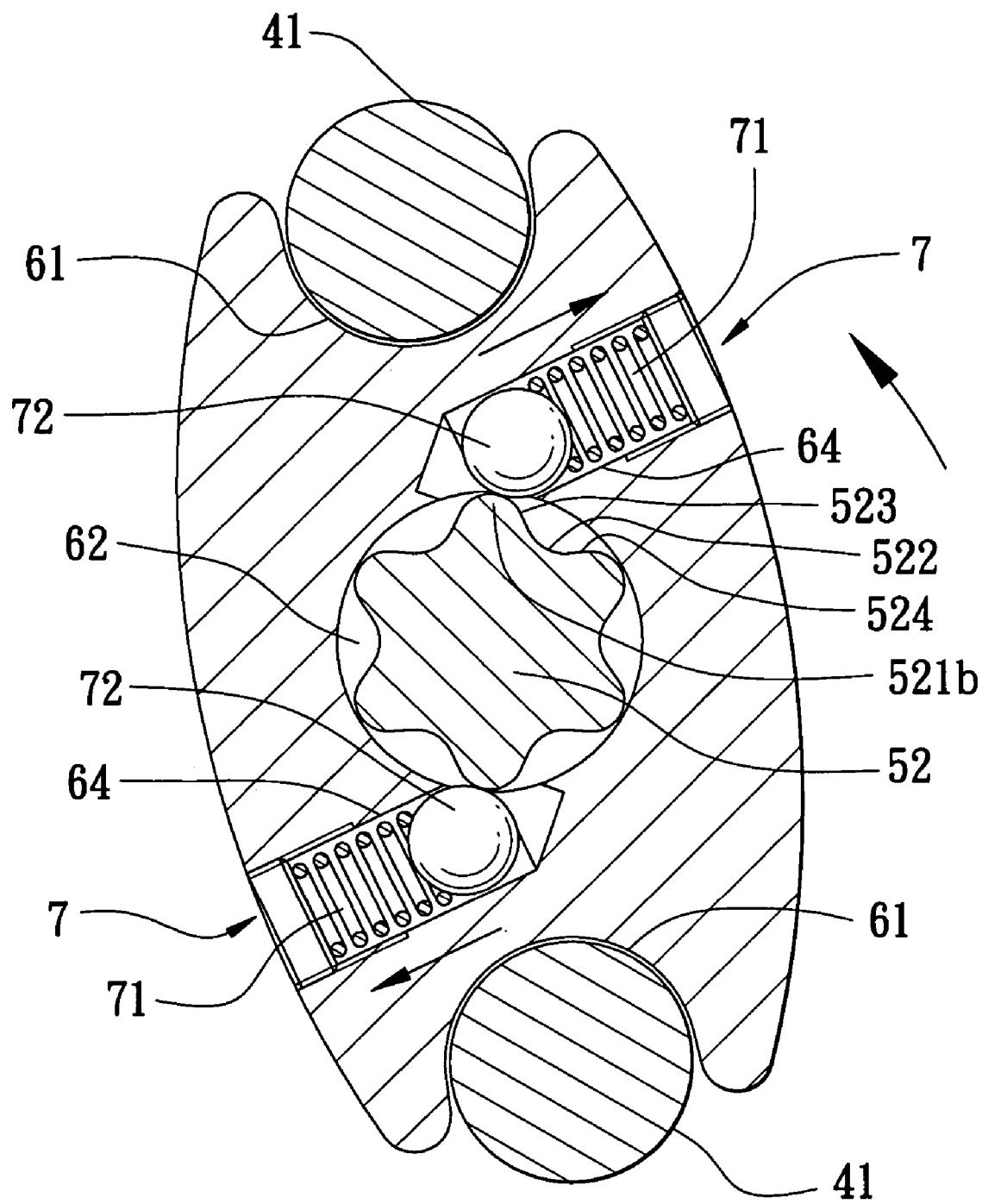
FIG. 6 is a sectional view of the preferred embodiment, showing the engaging element sliding over a tooth of the locking portion.

On the other hand, as shown in FIGS. 5 and 6, if the stem 51 is urged to turn in the counterclockwise direction, then the wall 523 of the other adjacent tooth 521*b* will be compelled to push the engaging element 72 away from the locking hole 62. Because the counter-acting force when the tooth 521*b* and the engaging element 72 contact each other is toward a direction away from the end wall 641, the engaging element 72 will be abutted by the tooth 521*b* and will in turn compress the spring 71 to retract into the bore 64. The engaging element 72 can now slide over the tooth 521*b* and the lock body 6 is thus permitted to turn in the counterclockwise direction.

As a consequence, when the fastener is used to fasten a container on the deck of a ship, the rope 8 to which the first fastener component 4 is connected can be tensioned easily and simply just by rotating the first fastener component 4 with the lock body 6 in the counterclockwise direction. The more deeply is the stem 51 threaded in the screw hole 431, the more is the overall length of the fastener shortened and consequently, the more tension is applied on the rope 8. Because the first fastener component 4 with the lock body 6 cannot be rotated in the clockwise direction, inadvertent slackening of the tension of the rope 8, as well as inadvertent disengagement of the locking portion 52 from the locking hole 62, can be avoided. In addition, should the fastener component 4 with the lock body 6 be urged to turn in the counterclockwise direction by severe movement of the ship, the fastening tension will only be increased, which reinforces the fastening effect.

It is worthwhile to mention that, to unfasten the cargo container, it is only necessary to apply an upward force on the lock body 6 so that the lock body 6 disengages from the stem 51 and slide upward along the rails 41 of the first fastener component 4 toward the second fixed body 42. The first fastener component 4 can thus be rotated as necessary to loosen the stem 51 from the screw hole 431.

It can be appreciated, from the foregoing, that the fastener according to the present invention has the following advantages and effects:

The present invention improves on the smoothness and convenience in operation not only because the non-circular locking portion 52 can be easily fitted into the circular locking hole 62, but the tension of the rope 8 connected to the fastener can be adjusted easily and simply by turning the first fastener component 4 with the lock body 6 in the one single permissible direction. In addition, ineffective fastening caused by disengagement of the lock body 6 from the stem 51 can be prevented by virtue of the lock body 6 not being rotatable in a direction opposite the one single permissible direction.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A fastener for securing a cargo container, comprising:
   a first fastener component including a first and a second fixed body, and a pair of rails bridging said first and said second fixed body, said first fixed body having a screw hole;
   a lock body mounted on said rails for sliding along said rails and having two opposite ends abutting respectively against said rails and a locking hole formed between said opposite ends;
   a second fastener component including a stem extending threadedly through said screw hole toward said second fixed body, and a locking portion extending into said locking hole; and
   an engagement unit providing engagement of said locking portion in said locking hole such that relative rotation of said stem and said lock body is permitted only in one single direction that causes said stem to move toward said second fixed body.

2. The fastener as claimed in claim 1, wherein said engagement unit includes at least one bore formed between said locking hole and one of said opposite ends in communication with said locking hole, an engaging element received in said bore for engaging said locking portion, and a spring biasing said engaging element.

3. The fastener as claimed in claim 2, wherein said locking portion is a toothed portion formed on said stem, and has a plurality of teeth and a plurality of recesses each defined by two adjacent ones of said teeth, and said locking hole is a circular hole.

4. The fastener as claimed in claim 3, wherein said bore extends in a tangential direction of said locking hole, said bore further including an end wall inclining with respect to said tangential direction, said engaging element being normally biased to protrude into said locking hole and to abut against said end wall, said teeth pushing said engaging element against said spring and away from said end wall when said relative rotation is made in said one single direction.

5. The fastener as claimed in claim 2, wherein said engagement unit includes a pair of said bores, one of said bores being formed between one of said opposite ends and said locking hole, and the other being formed between the other one of said opposite ends and said locking hole, each of said bores having a respective said engaging element and a respective said spring.

* * * * *